United States Patent [19]
Okada

[11] 3,794,136
[45] Feb. 26, 1974

[54] COLLISION DETECTING APPARATUS FOR A VEHICLE

[75] Inventor: Motohiro Okada, Tokyo, Japan

[73] Assignee: Honda Giken Kogyo Kabushiki Kaisha, Chuo-ku, Tokyo, Japan

[22] Filed: June 3, 1971

[21] Appl. No.: 149,698

[30] Foreign Application Priority Data
June 4, 1970    Japan.............................. 45/47580

[52] U.S. Cl............... 180/91, 73/517 R, 200/61.44, 280/150 AB
[51] Int. Cl............................................ B60r 21/02
[58] Field of Search........ 180/91, 103; 280/150 AB; 73/517 R, 518; 200/61.44, DIG. 10; 307/318; 340/52 H, 53, 61

[56] References Cited
UNITED STATES PATENTS

| | | | |
|---|---|---|---|
| 3,622,974 | 11/1971 | Best et al.................. | 280/150 AB X |
| 2,944,804 | 7/1960 | Persson et al................ | 73/517 R X |
| 3,225,695 | 12/1965 | Kapp et al. ..................... | 307/318 X |
| 3,663,035 | 5/1972 | Norton......................... | 280/150 AB |
| 2,764,019 | 9/1956 | Lindholm et al. ................... | 73/71.2 |
| 3,483,759 | 12/1969 | Venetos et al..................... | 73/517 R |
| 3,586,879 | 6/1971 | Ford ............................... | 307/318 X |
| 3,606,490 | 9/1971 | Ando.......................... | 303/21 CG X |
| 3,495,675 | 2/1970 | Hass et al. ............................ | 180/91 |

*Primary Examiner*—Kenneth H. Betts
*Assistant Examiner*—Leslie J. Paperner
*Attorney, Agent, or Firm*—Waters, Roditi, Schwartz & Nissen

[57] ABSTRACT

Electrical generators are connected to the body of a vehicle to detect deformation of the body at the time of collision and produce an electrical voltage signal to actuate a safety device such as an air bag. Each generator comprises a relatively movable coil and magnet assembly which is connected to the safety device by a circuit containing a Zener diode and possibly a silicon control rectifier to establish a threshold level for actuation of the safety device.

5 Claims, 4 Drawing Figures

INVENTOR
motohiro Okada
BY

PATENTED FEB 26 1974 3,794,136

INVENTOR
Motohiro Okada
BY

COLLISION DETECTING APPARATUS FOR A VEHICLE

BRIEF SUMMARY OF THE INVENTION

This invention relates to apparatus for detecting collision of a vehicle such as a motorcar for obtaining an electric signal for actuating a safety device such as an air bag which will protect the driver and passengers.

Such a detecting apparatus of this kind has been hitherto known in which an electrical switch is interposed in an electrical circuit connected between a safety device and an electric supply source such as a battery or the like and the switch is arranged to be closed upon deformation of the body of the vehicle during the collision.

This conventional apparatus is deficient in that the safety device is capable of being actuated when unnecessary as the electrical switch is immediately closed to permit electrical current flow if the magnitude of deformation of the vehicle body reaches a predetermined value regardless of the rate of speed of deformation of the car body, that is, the intensity of the collision.

An object of this invention is to provide an apparatus free from the foregoing deficiency and the invention is characterized in that a relatively movable coil and magnet assembly constituting an electrical generator is arranged so that when the coil and the magnet are relatively moved an electrical voltage is induced in the coil and received at output terminals to serve as an actuation signal for the safety device.

The placement of the generator in the vehicle body is significant as will be explained hereafter.

The front bumper of a vehicle is a protecting device for the body and is often deformed by being subjected to a slight collision. Therefore in detecting collision of the vehicle, a local deformation such as the deformation of only one end of the bumper should not be considered equivalent to a deformation of a portion of the vehicle body. The invention contemplates treating a deformation of the opposite ends of the bumper as equivalent to a deformation of the body above the bumper.

A further feature of the invention is characterized in that at least two electrical generators are provided, each comprising a relatively movable coil and magnet assembly, each of the generators being so arranged that when the coil and the magnet of either thereof is relatively moved an electrical voltage is induced in the coil, the coils of the generators being connected in series so that the electrical voltages induced in the coils are added together at the output terminals thereof to serve as an actuation signal for the safety device.

The actuation signal at the output terminals is applied to the actuator member for the safety device through a supply circuit, and a Zener diode is interposed in the circuit. Thus, the safety device will operate only when the output signal voltage is higher than a predetermined level, that is, the intensity of the collision is comparatively violent.

With this arrangement, however, when the diode is operative and allows an electrical current flow, a voltage drop is produced as a result of this electrical current flow and the diode becomes inoperative again, and this is repeated and the operation becomes intermittent.

To avoid this, the output terminals for the actuation signal are connected to the actuator member for the safety device through the Zener diode and a silicon control rectifier, so that when the output signal voltage is higher than a predetermined level the silicon control rectifier is fired.

In any of the foregoing cases, the relative movement between the coil and the magnet may be either a relative slidable movement or a relatively rotatable movement.

DETAILED DESCRIPTION

Figure 1:
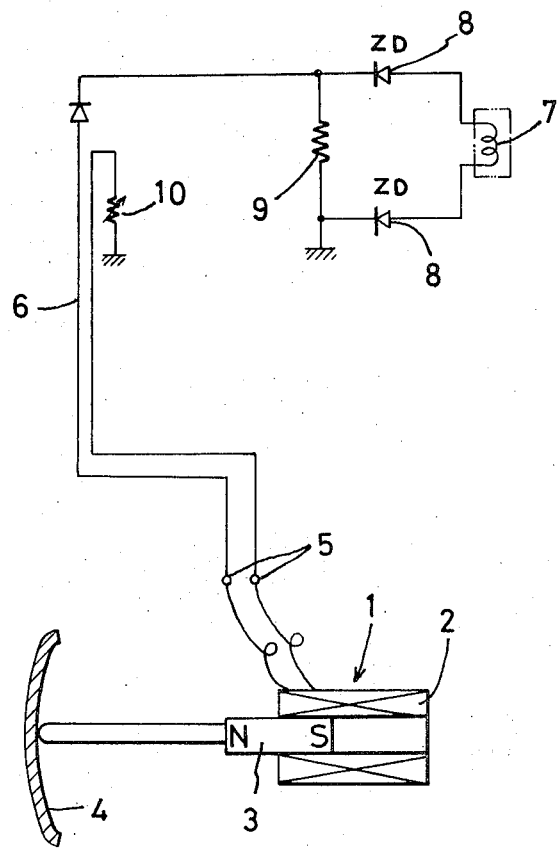
FIG. 1 is a diagrammatic illustration of one embodiment according to the invention.

Referring to FIG. 1, numeral 1 denotes an electrical generator comprising a coil 2 and a magnet 3 e.g., a permanent magnet, supported in a relatively slidable relationship. The coil 2 is stationary and the permanent magnet 3 is connected to any suitable portion 4 of the motorcar which is deformed at the time of a collision. Thus, by deformation of portion 4, the permanent magnet 3 moves within the coil 2 and a corresponding electrical voltage is induced in the coil 2 and is impressed at output terminals 5. This voltage at the output terminals 5 is transmitted via a circuit 6 to an actuator member 7 such as a firing filament or the like which actuates a safety device such as an air bag. A Zener diode 8 is interposed in circuit 6 so that the safety device can be actuated only when the output signal voltage is higher than a predetermined level. Numeral 9 denotes a grounding resistance cooperating with the Zener diode 8. In the illustrated embodiment, a variable resistance 10 is interposed in a circuit which grounds the other end of the coil 2, so that the voltage to be induced in the coil 2, that is, the detection sensitivity can be adjusted thereby.

The operation of the apparatus will now be described.

If the portion 4 of the vehicle body is deformed in a collision, the permanent magnet 3 is moved within the coil 2, so that an electrical voltage corresponding thereto is induced in the coil 2 and the voltage is received at the output terminals 5. When the collision is not comparatively severe, the movement of the permanent magnet 3 is comparatively slow and the electrical voltage induced in the coil 2 is comparatively low, so that the Zener diode 8 prevents the safety device from becoming actuated. When the collision is violent, the permanent magnet 3 moves rapidly within the coil 2 and a high voltage is induced in the coil 2, so that the voltage is applied to the safety device through the Zener diode 8 and the safety device is operated. Thus the safety device can be rendered operative by an electric voltage higher than a predetermined level, so that the safety device will be operated only by a violent collision of the motorcar.

Figure 2:
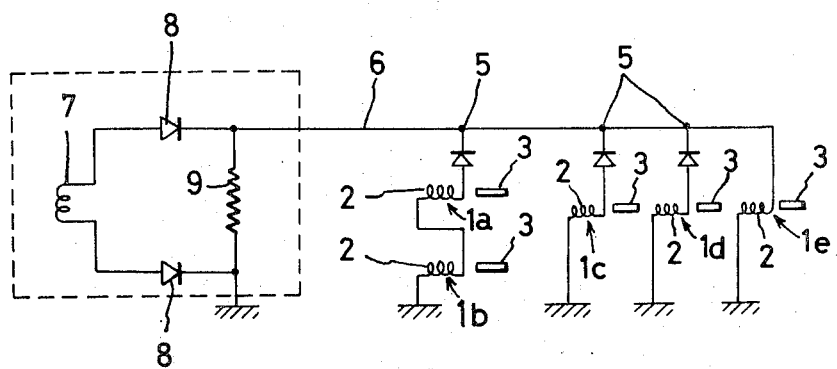
FIG. 2 is a circuit diagram of a modified embodiment.
Figure 3:
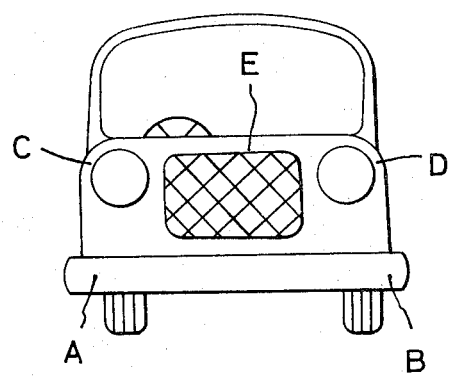
FIG. 3 is a front view of a vehicle showing the placement region of sensing elements of FIG. 2.

A modified embodiment is shown in FIG. 2 and FIG. 3, showing five predetermined portions of the front of a motorcar where electrical sensing generators are to be placed. Thus as seen in FIG. 3, generators are placed at opposite ends A and B of a front bumper of the motorcar and generators are placed in the body of the vehicle at ends C and D and the center E above the bumper. The respective electrical generators are designated in FIG. 2 as 1a,1b,1c,1d,1e, each comprising a coil 2 and a permanent magnet 3 as mentioned before in connection with FIG. 1. In general, the bumper of a motorcar serves to protect the car body from deformation caused by slight collision. Accordingly, in detecting a collision, a local deformation of the bumper, i.e., a deformation of one end A or the other end B alone thereof should not be considered equivalent to a deformation of other portions, for example, the portion C, D or E, and it is proper that a deformation of both the opposite ends A and B of the bumper be treated as equivalent to a deformation of the other portions. To meet this requirement, each of the two electrical generators 1a,1b corresponding to one end A and the other end B of the bumper, respectively, is constructed with about one-half the sensitivity of each of the generators 1c,1d,1e corresponding to the portions C,D,E. Also, the coils 2, of the two electrical generators 1a,1b are interconnected in series so that the electrical voltages induced in the coils 2, are received at the output terminal 5 in added manner.

The total output or an individual output of any of the other generators 1c, 1d, 1e is connected through Zener diode 8 to actuator member 7 of the safety device for operating the same.

Thus, when only one end A or the other end B of the bumper is deformed upon collision of the motorcar, a large output is not generated. Only when the opposite ends A,B are both deformed at almost the same output as in the case of deformation of any of the other portions C, D, E can the safety device be actuated. If there occurs only a deformation of either one of the end A or end B of the bumper, in an especially rapid deformation, a large output is generated in the corresponding coil 1a or 1b and the safety device can be actuated thereby.

Figure 4:
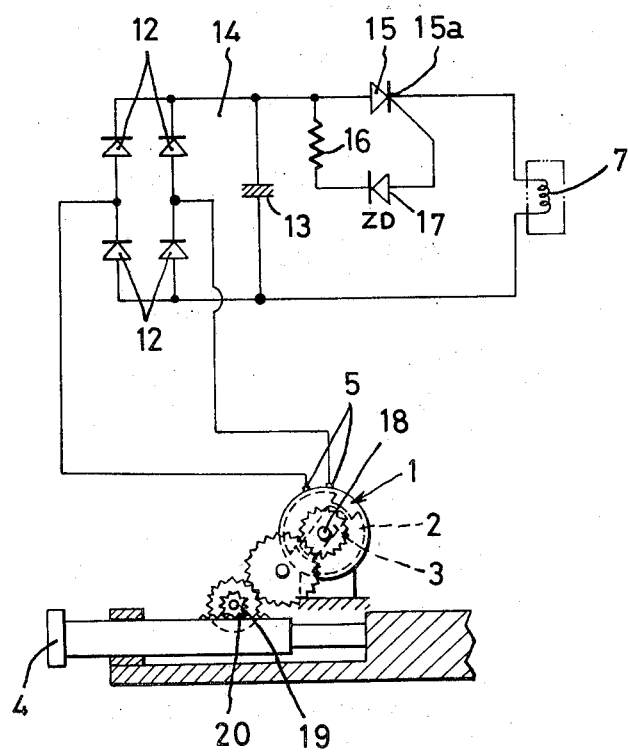
FIG. 4 is a circuit diagram of another modified embodiment of the invention.

Another modified embodiment is shown in FIG. 4, wherein electrical generator 1 comprises a coil 2 and a magnet 3 combined in a relatively rotatable relationship, and an input rotating shaft 18 is connected through a pinion 19 and a rack 20 to any desired portion 4 of a car body, so that by a deformation of portion 4 caused by collision, the rotating shaft 18 is rotated and the generator 1 is operated, whereby a corresponding electrical voltage is obtained at output terminals 5. The output terminal 5 is connected to a rectifying circuit 14 comprising four rectifiers 12 and a single condenser 13 so that the alternating current output of the generator 1 is changed to direct current output, and the output terminal of the rectifying circuit is connected through a silicon control rectifier 15 to actuator member 7 such as an electrical detonator or the like for a safety device such as an air bag. The rectifying circuit is connected to actuating member 7 through protecting resistance 16 and Zener diode 17 to gate terminal 15a of the rectifier 15. Thus if the output voltage of the generator 1 is higher than a predetermined level, the output acts on the terminal 15a through the Zener diode 17 so as to fire the silicon control rectifier 15 and therefore the output voltage is applied to the actuator member 7 through the rectifier 15. The generator 1 in this embodiment may be replaced by two or more generators 1a, 1b as in the foregoing embodiment. It is also possible for the coil 2 and the magnet 3 in the generator 1 or in each generator 1a, 1b in the foregoing embodiments to be either relatively slidable or relatively rotatable.

In the embodiment of FIGS. 1 and 2, the circuit 6 for supplying the actuator signal from the output terminals 5 to the actuator member 7 for the safety device has the Zener diode 8 directly interposed therein, but this type of arrangement is deficient in that the Zener diode 8 operates and allows an electrical current flow when the output voltage is higher than a predetermined level but an electrical voltage drop is caused as a result of this electric current flow and therefore the diode becomes inoperative again, this being repeated so that the operation becomes irregular.

In the modified embodiment of FIG. 4, however, the Zener diode 17 is used only for firing the silicon control rectifier 15 interposed in the main circuit, so that after the output voltage becomes higher than a predetermined level and the silicon control rectifier is fired, the silicon control rectifier 15 maintains its operating condition by its own characteristic feature even with a somewhat voltage drop and thus the foregoing deficiency is obviated.

Thus, according to this invention, a motorcar collision can be detected as an electrical voltage corresponding to the intensity of the collision, the safety device being arranged to be operative only by a voltage greater than a predetermined value. Thus, the safety device can be actuated only when the collision is violent and can be prevented from being unnecessarily operated when the collision is slight. According to a feature of this invention, only when a deformation of a bumper is caused at both its ends is this detected as a collision, thus obviating a condition of operation by deformation of only one end of the bumper. Additionally, according to a further feature of this invention, the Zener diode is used for firing the silicon control rectifier in the main circuit, avoiding the irregularity of operation when the Zener diode is directly interposed in the supply circuit of the safety device.

What is claimed is:

1. Apparatus for detecting collision of a vehicle and for operating a safety device in response thereto when the collision reaches a given magnitude, said apparatus comprising an electrical generator constituted by a relatively movable coil and magnet assembly, means mounting one said generator at each of the ends of a front bumper of the vehicle and additional generators on the vehicle above the bumper for responding to deformation of the part of the vehicle at said generators in a collision, said coil and magnet of each generator being so constructed and mounted on the vehicle to be relatively moved, at the time of a collision when the associated part of the vehicle undergoes deformation, to cause an electrical voltage to be induced in the coil, actuator means for a safety device, circuit means transmitting said voltage as an actuation signal to said actuator means to cause the safety device then to become operative, and means in said circuit means to block passage of said voltage until the voltage reaches a predetermined level so that the safety device will only be operated when the rate of deformation of at least one of said parts of the vehicle exceeds a threshold value.

2. An apparatus as claimed in claim 1, wherein said coil and magnet are relatively slidable.

3. An apparatus as claimed in claim 1 wherein said means to block the voltage comprises a Zener diode.

4. An apparatus as claimed in claim 1 wherein said electrical generators on said bumper are connected in series to provide a combined voltage signal for said circuit means.

5. An apparatus as claimed in claim 1 wherein the two said generators on the bumper are connected in series and each has one-half the sensitivity of the other generators.

* * * * *